UNITED STATES PATENT OFFICE.

JOHN ALSON, OF CHICAGO, ILLINOIS, ASSIGNOR OF THREE-FOURTHS TO ERICK J. THELIN, TITUS LUNDIN, AND FRED. LUNDIN, JR., ALL OF SAME PLACE.

ANTISEPTIC LOTION.

SPECIFICATION forming part of Letters Patent No. 428,033, dated May 13, 1890.

Application filed September 3, 1889. Serial No. 322,818. (No specimens.)

*To all whom it may concern:*

Be it known that I, JOHN ALSON, a citizen of the United States, residing at Chicago, in the county of Cook and State of Illinois, have invented certain new and useful Improvements in Antiseptic Lotions; and I do declare the following to be a full, clear, and exact description of the invention, such as will enable others skilled in the art to which it appertains to make and use the same.

My compound is to be used for beautifying the complexion, for securing relief from headache, and as a gargle or wash for cleansing the throat and mouth; and it consists of the following ingredients, combined in substantially the proportions stated below, viz: carbolic acid, two centigrams; boracic acid, ten grams; glycerine, sixty grams; distilled water, two hundred and seventy grams; oil of peppermint, forty centigrams; oil of cloves, forty centigrams; lemon-oil, one centigram; tartaric acid, forty centigrams; chlorate of potash, three grams; cochineal powder, one centigram.

This solution should be compounded in substantially the following manner: First, thoroughly mix the boracic acid and tartaric acid with the chlorate of potash; second, thoroughly treat the above mixture with the oil of peppermint, oil of cloves, and lemon-oil; third, dissolve the above mixture in the amount stated of warm distilled water, adding the carbolic acid and glycerine; finally, mix the cochineal powder with the foregoing. Then cool and filter the solution. This makes in all a mixture of three hundred and forty-four (344) grams and twenty-four (24) centigrams.

This solution is very healing, cleansing, and soothing to the skin, and has a refreshing effect. When used for alleviating suffering from headache, a cloth should be saturated with the mixture and applied to the head. Much benefit is derived from the use of the above mixture as a wash for the mouth to destroy bad breath and to remove disagreeable taste from the mouth. When used as a gargle or wash, the mixture should be diluted with an equal quantity of water.

I am aware of the existence of Patent No. 349,014, dated September 14, 1886, for improvements in cosmetic washes; and I do not therefore claim the ingredients enumerated therein and mixed in the proportions described; but What I do claim as my invention, and desire to secure by Letters Patent of the United States, is—

The herein-described medicinal compound or antiseptic lotion, consisting of carbolic acid, boracic acid, glycerine, distilled water, oil of peppermint, oil of cloves, lemon-oil, tartaric acid, chlorate of potash, and cochineal powder, in substantially the proportions stated, and in the manner set forth.

In testimony whereof I affix my signature in presence of two witnesses.

JOHN ALSON.

Witnesses:
  R. E. BUCHANAN,
  ED DE ANGUERA.